United States Patent
Bauer

[19]

[11] Patent Number: 6,076,775
[45] Date of Patent: Jun. 20, 2000

[54] AIRFOIL WITH A LANDING FLAP HAVING A FLEXIBLE TRAILING EDGE

[75] Inventor: Claus Bauer, Dreieich, Germany

[73] Assignee: DaimlerChrysler AG, Stuttgart, Germany

[21] Appl. No.: 09/127,406

[22] Filed: Jul. 31, 1998

[30] Foreign Application Priority Data

Jul. 31, 1997 [DE] Germany .............. 197 32 953

[51] Int. Cl.$^7$ ........................................ B64C 3/58
[52] U.S. Cl. ............... 244/212; 244/215; 244/219; 244/201
[58] Field of Search .................. 244/215, 219, 244/212, 216, 200, 201, 217, 213

[56] References Cited

U.S. PATENT DOCUMENTS

| Re. 32,907 | 4/1989 | Rudolph | 244/212 |
|---|---|---|---|
| 3,042,371 | 6/1962 | Fahti | 244/219 |
| 3,478,987 | 11/1969 | Dorand | 244/212 |
| 3,583,660 | 6/1971 | Hurkamp | 244/212 |
| 4,053,124 | 10/1977 | Cole | 244/219 |
| 4,247,066 | 1/1981 | Frost et al. | 244/219 |
| 4,351,502 | 9/1982 | Statkus | 244/219 |
| 4,427,169 | 1/1984 | Brown | 244/219 |
| 4,899,284 | 2/1990 | Lewis et al. | 244/219 |
| 5,839,698 | 11/1998 | Moppert | 244/219 |
| 5,839,700 | 11/1998 | Nedderman, Jr. | 244/219 |
| 5,887,828 | 3/1999 | Appa | 244/219 |

FOREIGN PATENT DOCUMENTS

| 703375 | 2/1941 | Germany . |
|---|---|---|
| 3101847 | 12/1981 | Germany . |
| 3133961 | 4/1983 | Germany . |
| 3527497 | 2/1987 | Germany . |
| 4107556 | 5/1992 | Germany . |
| 4243203 | 6/1994 | Germany . |

*Primary Examiner*—J. Woodrow Eldred
*Attorney, Agent, or Firm*—W. F. Fasse; W. G. Fasse

[57] ABSTRACT

A lifting airfoil (10) includes a landing flap (20) movably connected to a main airfoil body (10') so as to form at least a portion of the trailing edge of the airfoil. The landing flap (20) includes a leading edge nose (21) and a trailing edge body (22), which are each bounded by an upper cover skin (23) and a lower cover skin (24). The trailing edge body (22) is connected to the leading edge (21) by the continuous upper cover skin (23), while a gap (25) interrupts the lower cover skin (24) between the leading edge nose (21) and the trailing edge body (22). The flap (20) is mounted on a carriage (31) that moves along a guide rail (30) so as to be slidably and pivotably extendable during take-off and landing phases of a flight. Furthermore, the trailing edge body (22) is elastically flexible and can be deflected as needed for adjusting the camber thereof during cruise flight by operating an actuating device (29) that is pivotably connected between a trailing edge area of the trailing edge body (22) and the guide rail (30).

32 Claims, 3 Drawing Sheets

6,076,775

AIRFOIL WITH A LANDING FLAP HAVING A FLEXIBLE TRAILING EDGE

PRIORITY CLAIM

This application is based on and claims the priority under 35 U.S.C. §119 of German Patent Application 197 32 953.5, filed on Jul. 31, 1997. The entire disclosure of German Patent Application 197 32 953.5 is incorporated herein by reference.

FIELD OF THE INVENTION

The invention relates to a lifting airfoil such as an aircraft wing with a landing flap that forms at least a portion of a trailing edge of the airfoil and that is movably connected to the main body of the airfoil, wherein the landing flap has a flap leading edge nose and a flap trailing edge body and is bounded by a pressure-side cover skin and a vacuum-side cover skin.

BACKGROUND INFORMATION

In the design of the airfoils of aircraft, it is desirable that the geometry of the airfoil profile and particularly the camber of the airfoil is adjustable or adaptable to the varying boundary conditions prevailing during the course of a flight. In one class of conventional airfoils, an adjustment of the position or configuration of the airfoil trailing edge is only carried out during take-off and landing phases.

German Patent 4,107,556 (Gartelmann et al.) discloses one possible arrangement of a moveable landing flap on an airfoil. In this known arrangement, the landing flap is rotatably connected to a carriage that is movably arranged on a guide rail, whereby the landing flap is slidably movable, while a pivotally connected lever varies the angle of the landing flap during its sliding extension movement. During the take-off or landing phase of the aircraft, the landing flap is extended toward the rear, whereby the airfoil surface area is enlarged and the profile contour and particularly the camber of the airfoil is altered due to the variation of the angle of the landing flap.

Moreover, it is also desirable to be able to modify the trailing edge of the airfoil during cruise flight in order to better utilize or achieve the optimum flow potential of the wings of commercial transport aircraft. For this reason, arrangements have also become known, which make it possible to vary the contour of the airfoil trailing edge during cruise flight. For example, German Patent Document 3,527,497 describes a trailing edge construction in which a flap is slidably arranged in a guide channel, with an outrigger pivotally connected to supporting structures of the airfoil wing, whereby a sliding extension of the flap in the guide channel achieves a variation of the trailing edge contour. However, this known arrangement provides for a variation of the trailing edge contour in only one direction, and it is not possible to achieve a freely selectable control or actuation of the trailing edge without limitations. Particularly, it is not possible to achieve a continuously curved, kink-free or bend-free profile geometry of the airfoil.

German Patent Publication 3,101,847 discloses that it is known to increase the lift of a lifting airfoil and/or to reduce the airflow disrupting mechanisms, by embodying the trailing edge as a flap that can be pivotally adjusted about internally arranged pivot axes extending in the span width direction, by means of internally arranged control arms extending in the airflow direction. However, it has been found that disadvantageous lever arms result from the internally arranged axes and control arms while carrying out the flap adjustment movements. For this reason, large actuation forces are necessary.

German Patent 703,375 (Weber) describes a trailing edge control surface arranged to be pivotable about a pivot axis that extends in the span width direction. The force and motion transmission to the control surface is carried out via a push rod and a lever that pivot a drive shaft arranged along the pivot axis, which in turn tilts a drive lever that carries a motion actuator member arranged within the control surface. The control surface is formed by a rearward extension of the cover skins of the airfoil with the space therebetween filled out with foam rubber, so that this trailing edge control surface is flexible or bendable about the pivot axis. The two cover skins are respectively slidably connected to the motion actuator member, so that tilting of the actuator member applies a force within the control surface to deflect the same. The control surface is especially a control surface connected to a horizontal stabilizer or a vertical stabilizer of an aircraft tailplane. If the control surface is connected to a lifting wing airfoil via the pivot axis, it is not possible to achieve a kink-free of bend-free deflection of the control surface, since the deflection takes place about the pivot axis, especially for large deflections whereby the cover skins may directly contact the drive lever, the actuator member or even the drive shaft.

U.S. Pat. No. 4,247,066 (Frost et al.) describes a bendable, variable camber airfoil comprising flexible cover skins slidably connected onto airfoil ribs embodied as trusslike bendable beams. Namely, each rib comprises a plurality of relatively movably interconnected truss members and a jackscrew drive mechanism operatively connected to the truss members. By actuating the jackscrew, the bendable beam forming each rib can be bent or deflected, while the flexible cover skins slidably and flexibly follow the contour of the deflected rib beam so as to achieve a variation in the airfoil camber and surface curvature. The known bending beam arrangement is quite complicated, expensive, and heavy relative to a conventional fixed rib construction. It is also questionable whether the arrangement of articulately connected truss members and a jackscrew mechanism provides sufficient rigidity and structural strength for meeting the applicable requirements.

It has been found that the several different known arrangements are unable to achieve a continuous, kink-free curving or bending of the airfoil profile and particularly the profile of the trailing edge portion. Moreover, in the arrangements in which the drive for varying the trailing edge contour is arranged within the airfoil itself, this leads to disadvantageous transmission ratios, e.g. lever ratios, and consequent high actuation forces. Furthermore, the internally arranged adjustment devices in most cases are characterized by a rather high weight, and are difficult to access for maintenance purposes. Any arrangement in which a movable trailing edge is actuated by means of a control arm or rod and lever linkages is rather complicated and costly, and comprises many parts that are subject to rapid wear.

SUMMARY OF THE INVENTION

In view of the above, it is an object of the invention to further develop the trailing edge portion of a lifting airfoil so that it is possible to achieve a desired variation of the curvature or camber of the trailing edge portion in a kink-free manner, both upward and downward, using a low actuation force, while maintaining the structure of conventional airfoils to the extent possible. The invention further aims to avoid or overcome the disadvantages of the prior art, and achieve additional advantages, as apparent from the present description.

The above objects have been achieved in a lifting airfoil construction according to the invention, with a flap, e.g. a landing flap, that forms at least a portion of the trailing edge of the airfoil and that is pivotally connected to the main body of the airfoil by a motion mechanism. The landing flap includes a flap leading edge nose and a flap trailing edge body, and is bounded by a vacuum-side or suction-side cover skin and a pressure-side cover skin. Particularly according to the invention, the flap trailing edge body is elastically flexible, and the arrangement further comprises an actuating device that is pivotally connected to the landing flap and adapted to be actuated to elastically bend or deflect the trailing edge of the landing flap. In this manner, it is possible to achieve a kink-free variation of the camber of the lifting airfoil profile in the area of the trailing edge, for example during cruise flight of the aircraft. Throughout this specification, the term "kink-free" refers to a curve that is smooth and continuous, without a sharp break, kink, cusp or deflection point deviating from a smooth curve. Also, the terms "pressure-side" and "vacuum-side" respectively refer to the side of the airfoil subjected to a higher pressure and the side of the airfoil subjected to a lower pressure.

With the flexible trailing edge construction according to the invention, the operational flexibility and the flight performance of the lifting airfoil can be increased for the respective prevailing flight conditions, and it is possible to achieve a savings in fuel consumption. Another advantage of the arrangement according to the invention is seen in a very effective force introduction, which reduces the necessary actuating forces to a fraction of the conventionally necessary values, by using the landing flap itself as a lever arm. Moreover, using the present arrangement, it is possible to vary the camber of the airfoil profile as desired both upward and downward in a prescribed range. It has further been found that the arrangement according to the invention can be realized by a rather minimal change in existing airfoil constructions, and only a relatively small number of actuating devices or motion arrangements are necessary. Also, all of the components of the present arrangement are easily accessible for carrying out maintenance work.

In a preferred embodiment, the mechanism necessary for extending the landing flap is also used for mounting the actuating device and the motion arrangement on the supporting components of the lifting airfoil. In conventional lifting airfoils, for example as described in the above mentioned German Patent 4,107,556 (Gartelmann et al.), the landing flap is pivotally mounted by means of a forward bearing block or bracket on a carriage, which in turn is movably arranged on a guide rail that is secured to supporting components of the airfoil and extends in the airflow direction or chord length direction. This arrangement makes possible a sliding motion of the landing flap. Simultaneously during the linear or sliding motion, the trailing edge angle is varied by means of an articulately connected lever. Larger lifting airfoils generally comprise a plurality of landing flaps, whereby each individual landing flap is respectively supported and positioned by means of a plurality of guide rails and associated levers that are respectively offset from each other in the direction of the span width of the airfoil.

The invention uses a guide rail and carriage generally similarly as in the conventional arrangement. However, preferably according to the invention, the actuating device is arranged between the end of the guide rail and the flap trailing edge body. Respective bearings arranged on the rail-end and on the flap-end of the actuating device provide a connection whereby the above mentioned components are pivotable relative to each other. An advantageous effect of this arrangement is that the actuating device can be locked at a neutral length adjustment, and then functions as a pivoting lever for altering the angle of the flap during the sliding extension of the flap. This is carried out especially during take-off and landing phases.

On the other hand, the flap trailing edge body is elastically deflected by operating the actuating device, especially during cruise flight phases. The elastic bending or deflection of the flap trailing edge body can be achieved in that the pressure-side cover skin and vacuum-side cover skin are respectively made of an elastically flexible material, while webs, spars, or ribs that extend in the span width direction are arranged between the two cover skins to strengthen the structure of the flap trailing edge body without limiting the ability of the trailing edge to be elastically deflected. Also for reasons of overall strength and stiffness, the vacuum-side cover skin of the flap trailing edge body preferably has a greater thickness in the area near the flap leading edge nose as compared to the rear or trailing edge area, while the pressure-side cover skin has a homogenous or uniform thickness at all locations. Alternatively, different configurations or constructions may be necessary or desired under certain conditions.

In one embodiment, the pressure-side cover skin can extend continuously from the flap trailing edge body onto the flap leading edge nose where it is secured, while the vacuum-side cover skin can be interrupted with a spacing gap between the leading edge nose and the trailing edge body. However, in a preferable arrangement, the flexible flap trailing edge body is secured to the stiff or inflexible flap leading edge nose via the continuous vacuum-side cover skin, while a tangential displacement of the pressure-side cover skin relatively between the leading edge nose and the trailing edge body is made possible by means of a spacing gap between the leading edge nose and the trailing edge body which interrupts or breaks the continuity of the pressure-side cover skin. This spacing gap is preferably covered by a trim fairing in an aerodynamically advantageous manner.

Insofar as one of the two cover skins is thicker than the other in a particular embodiment, the flap trailing edge body will be secured to the flap leading edge nose via this thicker cover skin. The continuous thicker cover skin forms a hinge connection between the flap leading edge nose and the flap trailing edge body. Similarly like the actuating device, the gap between the flap leading edge nose and the flap trailing edge body can be locked during the extension motion of the landing flap for the take-off and landing phases of the flight. This can be achieved by any known locking bolt, pin or cam, to ensure that the leading edge nose and the trailing edge body move as a unit without relative deflections during the sliding and tilting extension of the flap.

In order to support the flexible flap trailing edge body, it is advantageous to provide a moveable support arrangement between the flap-side bearing of the actuating device and the junction of the flap leading edge nose with the flap trailing edge body, and to connect this moveable support arrangement to the flap trailing edge body. This moveable support arrangement prevents the flexible trailing edge from buckling or bending undesirably toward the vacuum-side due to the aerodynamic loads, and makes it possible to achieve the desired deflection contour of the trailing edge under all conditions. In order that the moveable support arrangement does not hinder the movement of the landing flap during the landing or take-off phases of the flight, it is advantageous to pivotally connect the moveable support arrangement by means of a support bracket onto the carriage that rides along the guide rail for carrying out the linear movement of the landing flap. For this purpose, the moveable support arrangement can also be locked or arrested in a neutral position.

In the above described motion or movement mechanism, in order to extend the landing flap during the take-off or landing phases of a flight, the flap is slidingly moved toward the rear and tilted downward by means of the rigidly locked actuating device. Namely, the rearward sliding of the flap causes the locked actuating device to pivot along a circular arc about its rail-side bearing, whereby the flap is caused to tilt downward. For this purpose, the landing flap must be rotatable relative to the carriage about a pivot axis that extends in the span width direction. Since this rotational or pivotal motion of the landing flap about the pivot axis is not desired during cruise flight, i.e. when the trailing edge is merely to be flexibly deflected but not slidingly and tiltingly extended, it is possible to block the rotational movement about the pivot axis. For example, it is possible to mount the flap leading edge nose in a rotatable yet blockable manner on the bearing block by means of a fixed bolt and an unlockable bolt, and in turn to rigidly connect the bearing block to the carriage. However, it is advantageous and preferred to pivotably interconnect the carriage and the bearing block by a fixed bolt and an unlockable bolt, while the flap nose is rigidly or fixedly connected to the bearing block.

A control unit is provided for coordinating the locking of the rotational movement of the landing flap, the tangential displacement of the cover skins (i.e. the deflection of the trailing edge body relative to the leading edge nose about the hinge formed by the continuous vacuum-side cover skin), and the respective actuation of the moveable support arrangement as well as the actuating device during cruise flight and during the take-off and landing phases of a flight. In lifting airfoils having a plurality of guide rails per landing flap, the flexible trailing edge may be deflected to differing extents at different locations along its span width, simply in that respective adjacent actuating devices are actuated to extend differing amounts.

BRIEF DESCRIPTION OF THE DRAWINGS

In order that the invention may be clearly understood, it will now be described in connection with two example embodiments, with reference to the drawings, wherein.

DETAILED DESCRIPTION OF PREFERRED EXAMPLE EMBODIMENTS AND OF THE BEST MODE OF THE INVENTION

Figure 1:
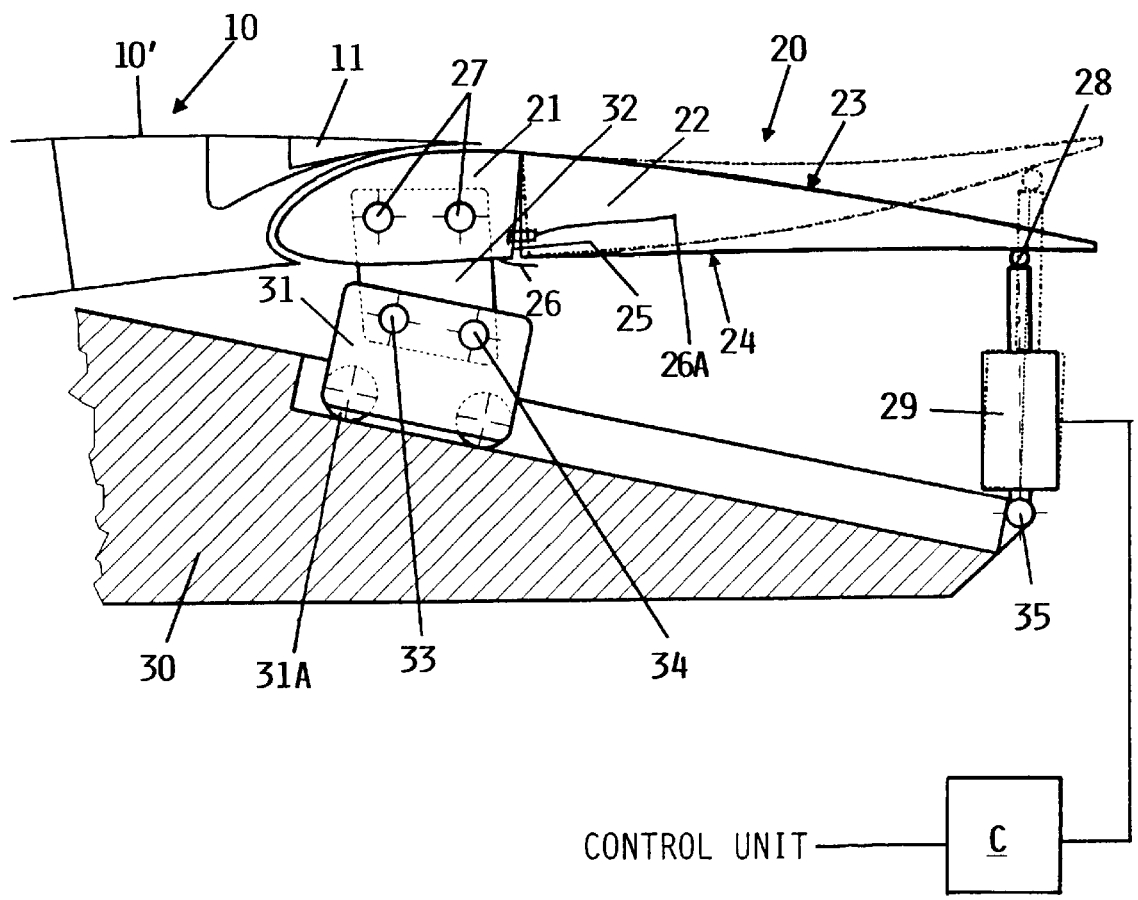
FIG. 1 is a schematic section, taken in the airflow or chord length direction, of an airfoil trailing edge arrangement according to the invention, with a landing flap that includes a flexible trailing edge body and that is pivotally connected to a carriage that slides along a guide rail, and an actuating device mounted on the guide rail.

FIG. 1 schematically shows a section through the trailing edge portion of a lifting airfoil 10 such as a lifting wing of a commercial or transport aircraft. The lifting airfoil 10 includes a main airfoil body 10' and a landing flap 20 connected to the airfoil main body 10' along a trailing edge area thereof. An upwardly deflectable spoiler 11 partially covers the leading edge area of the landing flap 20. The landing flap 20 is made up of a flap leading edge nose 21 and a flap trailing edge body 22, which forms the main body portion of the flap 20 extending from the flap nose 21 to a trailing edge of the flap. As will be described in further detail below, the flap trailing edge body 22 is flexibly connected to the flap nose 21, and the flap trailing edge body 22 is elastically flexible and deflectable in itself. Also, the flap 20 is slidingly and tiltingly extendable toward the rear away from the airfoil main body 10'.

In order to enable the extension and adjustment of the landing flap 20 during the take-off and landing phases of a flight and also during cruise flight, a drive and guide system is associated with and connected to the landing flap 20. The individual components of the drive and guide system, which will be described in detail below, are generally arranged near the lateral ends of the respective landing flap 20, but if needed for reasons of strength in particular applications, these components may also be arranged in the middle or along the span of the respective landing flap 20.

Particularly, the components of the flap drive and guide system are as follows. A guide rail 30 is mounted to extend from the main airfoil body 10' and serves to receive and carry a carriage 31 including rollers 31A that are slidable or rollable along the direction of extension of the guide rail 30. Any known drive mechanism, such as a worm screw (not shown), is provided for driving the carriage 31 along the rail 30 as needed. The landing flap 20, and particularly the flap nose 21 in the illustrated embodiment, is connected to the slidable carriage 31 by means of a forward bearing block or bracket 32. In this embodiment, the flap nose 21 is rigidly secured to the forward bearing block 32 by means of two fixed bolts 27, while the bearing block 32 in turn is selectively pivotably connected to the carriage 31 by means of a first permanent bolt 33, about which the bearing block 32 may pivot, and a first unlockable bolt 34 that selectively blocks the pivoting. In this manner, when the unlockable bolt 34 is unlocked, the bearing block 32 and together therewith the landing flap 20 may be pivoted about the fixed bolt 33 during the take-off and landing phases of a flight. It should be understood that the respective bolts 33 of the several landing flap drive and guide systems along the span width of the landing flap form a pivot axis that extends in the span width direction.

An actuating device 29 is pivotally connected by means of a rail-side bearing 35 to the rear end of the guide rail 30. A further flap-side bearing 28 pivotally connects the upper end of the actuating device 29 to the trailing edge area of the flap trailing edge body 22 of the landing flap 20. The actuating device 29 may be actuated so that it has a variable length between the respective bearings 35 and 28. In this manner, the flap trailing edge body 22 may be flexibly deflected as will be described below. However, for the normal extension of the flap 20 during take-off or landing phases of the flight, the actuating device 29 is locked in a neutral position. When the landing flap 20 is then extended rearwardly by moving the carriage 31 along the guide rail 30, with the above described arrangement, the locked actuating device 29 will be tilted or pivoted rearwardly along a circular path about the bearing 35. Due to this pivotal tilting of the actuating device 29, the rear or trailing edge of the flap trailing edge body 22 will be moved downwardly and rearwardly, which increases the camber of the overall airfoil.

As can be seen in FIG. 1 and as mentioned generally above, the actuating device 29 is arranged entirely externally of the flap 20 and the airfoil main body 10'. The actuating device 29 may comprise a respective hydraulic piston cylinder device, or any known mechanical actuator, for example using a jackscrew or the like in combination with a hydraulic, pneumatic or electric motor. It should also be understood that the present actuating device 29 can be used in connection with wing flap constructions comprising any other suitable mechanism for achieving both a translational movement and a tilting of the landing flap, for example comprising a rod linkage or the like, rather than the rail 30 and carriage 31 as described here.

In the present example embodiment, the flap trailing edge body 22 is securely connected to the flap leading edge nose 21 only by means of the vacuum-side cover skin 23. It should be understood that this connection allows some flexibility about a flexible hinge formed by the cover skin 23 between the flap trailing edge body 22 and the flap leading edge nose 21. On the other hand, the pressure-side cover skin 24 that covers the bottom of the flap 20 comprises a gap or free space 25 between the forward edge of the flap trailing edge body 22 and the rear edge of the flap leading edge nose 21. A fairing or cover 26 covers this gap 25 in an aerodynamically advantageous manner. The trailing edge body 22 may further be selectively locked to the leading edge nose 21 by a locking device 26A, such as a locking pin or locking cam, which is merely schematically indicated in FIG. 1. The locking device 26A is actuated when it is not desired to allow flexible deflection of the trailing edge body 22 relative to the leading edge nose 21 via the gap 25 and the hinge formed by the cover skin 23, for example during normal extension of the flap 20 in the take-off and landing phases of a flight.

With the above arrangement, the landing flap 20 may be flexibly deflected during cruise flight by operating the actuating device 29 so as to variably modify the spacing between the guide rail 30 and the flap trailing edge body 22 and to flexibly alter the camber of the trailing edge body 22 into a deflected position, as is shown by dash-dotted lines in FIG. 1. The non-deflected neutral position is shown by solid lines. Particularly with this arrangement including one continuous cover skin and one cover skin interrupted by the gap 25, it is possible to minimize the tensions that are caused in the vacuum-side cover skin 23 and the pressure-side cover skin 24 while carrying out such a flexible deflection of the flap trailing edge body 22. The elastic bending deflection in this embodiment lies in a range of ±15 to 20°, whereby the vertex of the deflection angle is located within the flap 20 between the vacuum-side cover skin 23 and the pressure-side cover skin 24, at a location spaced away from the rear trailing edge of the landing flap by a distance equal to 10% of the local profile depth of the airfoil.

As shown merely schematically in FIG. 1, a control unit C is connected for control signal transmission to the actuating device 29 and the other motive components for controlling and coordinating all of the different movements and locking or unlocking actions as described herein.

Figure 2:
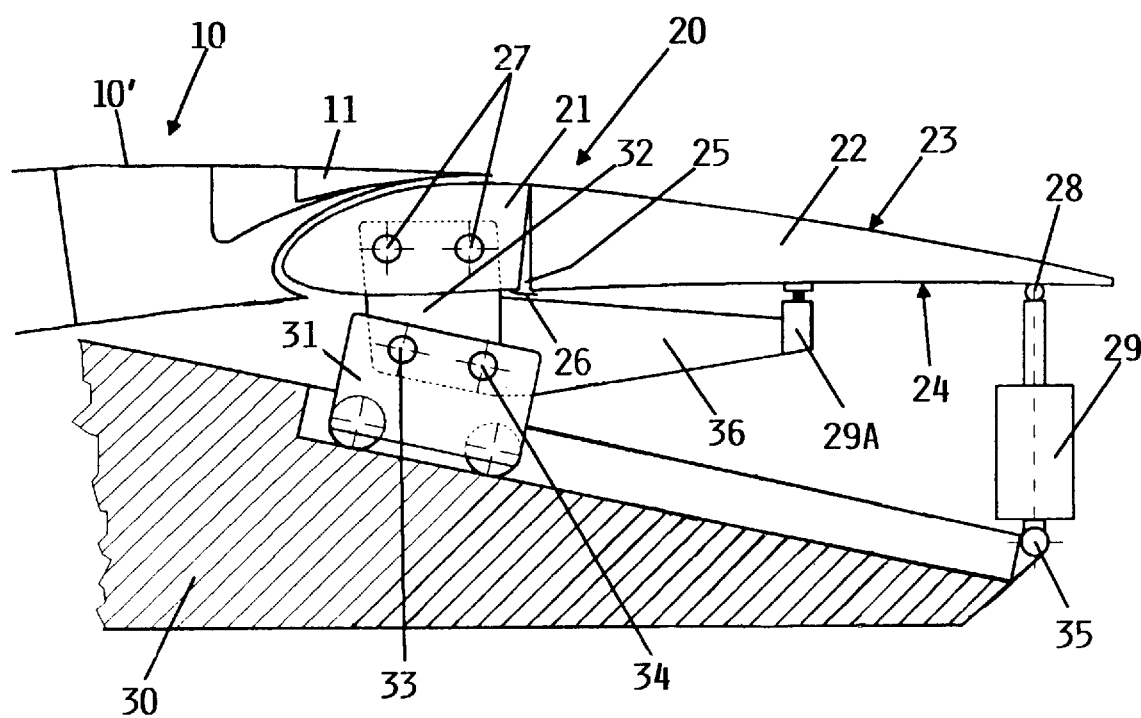
FIG. 2 is a schematic sectional view similar to that of FIG. 1, but further including a moveable support arrangement mounted on the carriage.

FIG. 2 shows a modified configuration of a lifting airfoil 10 including a landing flap 20 that is pivotally connected to a main airfoil body 10', wherein the junction between the landing flap 20 and the main airfoil body 10' is at least partially covered by a spoiler 11. The components and their arrangement according to the embodiment of FIG. 2 substantially correspond to the embodiment of FIG. 1, and a redundant description of like-numbered components is omitted. The embodiment of FIG. 2 differs from that of FIG. 1 in that a moveable support arrangement 29A is connected to the flap trailing edge body 22 between the flap leading edge nose 21 and the flap-side bearing 28 of the actuating device 29. The moveable support arrangement 29A supports the flap trailing edge body 22 along its chord length, and may also supplement or reinforce the deflection of the flap trailing edge body 22 along with the actuating device 29.

To achieve this, the moveable support arrangement 29A may comprise any known active actuating device or even simply a passive damper or biasing device. In order to prevent the moveable support arrangement 29A from exerting an interfering influence on the proper movement of the landing flap 20 when the landing flap 20 is extended during take-off and landing phases of a flight, the moveable support arrangement 29A is mounted on a stiff or rigid support arm 36, which in turn is rigidly connected to the forward bearing block 32, which in turn is connected to the carriage 31 and the leading edge nose 21 as described above. With this arrangement, the stiff support arm 36 moves and pivots together with the forward bearing block 32, and thus ensures that the flap trailing edge body 22 moves together with the flap leading edge nose 21 when the landing flap 20 is extended for take-off or landing phases.

Figure 3:
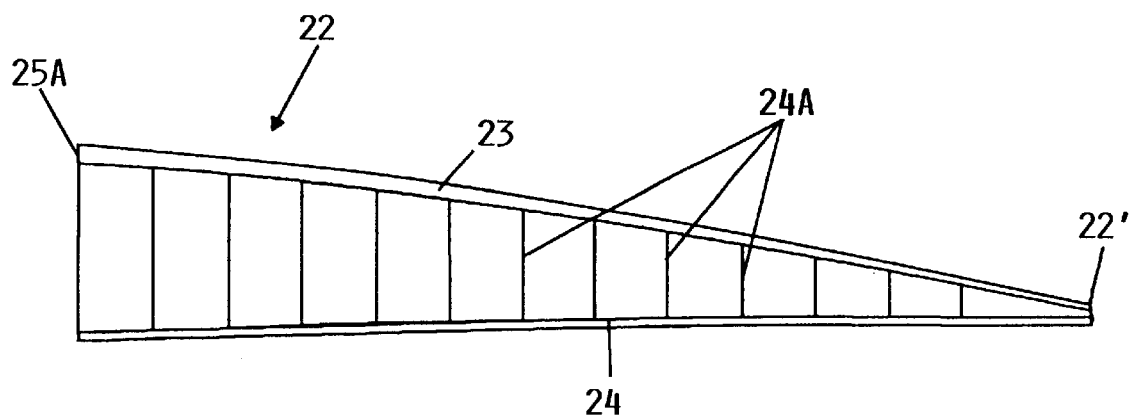
FIG. 3 is a schematic section, taken in the airflow or chord length direction, of the flap trailing edge body of a landing flap showing the skin and rib construction.

FIG. 3 schematically represents the construction of the flexible flap trailing edge body 22. The core of the flap trailing edge body 22 comprises a plurality of webs or ribs 24A that extend in the span width direction and that respectively have decreasing lengths or heights toward the rear, i.e. toward the trailing edge 22'. A pressure-side cover skin 24 covers the bottom of the webs or ribs 24A, while a vacuum-side cover skin 23 covers the top of the webs or ribs 24A, whereby the webs or ribs 24A are rigidly connected to and interconnect the two cover skins. In the illustrated example embodiment, the thickness of the top or vacuum-side cover skin 23 tapers from front to back, namely from a connection portion 25A that spans and connects to the flap leading edge nose 21 toward the trailing edge 22'.

While the span-wise extending webs or ribs 24A strengthen the structure of the flap trailing edge body 22 in a span-wise direction, they do not hinder the flexibility of the flap trailing edge body 22 in the camber deflection direction. By varying the number of the webs or ribs 24A and the cross-sectional dimensions of the cover skins and the webs or ribs, it is possible to vary the stiffness and strength of the flap trailing edge body 22 as needed for any particular application.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lifting airfoil comprising:

an airfoil body having a forward edge and a rear edge, a flap movably connected to said airfoil body at said rear edge, wherein said flap comprises a flap leading edge nose and a flap trailing edge body, said flap trailing edge body is elastically flexible, said flap trailing edge body terminates along a flap trailing edge that forms a trailing edge of said airfoil, and said flap leading edge nose and said flap trailing edge body comprise and are bounded by a pressure-side cover skin and a vacuum-side cover skin, and an actuating device that is arranged externally of said flap, pivotally connected to said flap, and adapted to selectively elastically bend said flap trailing edge body.

2. The lifting airfoil according to claim 1, wherein said flap leading edge nose is flexurally stiff and unbendable relative to said flap trailing edge body.

3. The lifting airfoil according to claim 1, wherein said flap trailing edge body further comprises transverse webs extending in a span width direction of said airfoil, and said transverse webs respectively interconnect and support said pressure-side cover skin and said vacuum-side cover skin.

4. The lifting airfoil according to claim 3, wherein said flap trailing edge body excludes webs extending in a chord length direction of said airfoil.

5. The lifting airfoil according to claim 3, wherein said cover skins are rigidly secured to said transverse webs.

6. The lifting airfoil according to claim 3, wherein said cover skins are elastically flexible, and said transverse ribs are so arranged so that said flap trailing edge body is elastically flexibly bendable in a plane perpendicular to said transverse webs and is resistant to bending in a plane parallel to said transverse webs.

7. The lifting airfoil according to claim 1, wherein at least one of said cover skins has a thickness that is variable along a chord length direction of said airfoil.

8. The lifting airfoil according to claim 1, wherein said vacuum-side cover skin is relatively thicker at said flap leading edge nose and relatively thinner toward said flap trailing edge on said flap trailing edge body, and said pressure-side cover skin has a uniform thickness everywhere.

9. The lifting airfoil according to claim 1, wherein said flap leading edge nose and said flap trailing edge body are connected to each other by only one of said cover skins extending continuously over said nose and said body, and the other of said cover skins is interrupted by a gap between said nose and said body.

10. The lifting airfoil according to claim 9, wherein said vacuum-side cover skin is said one of said cover skins extending continuously over said nose and said body, and said pressure-side cover skin is said other cover skin interrupted by said gap.

11. The lifting airfoil according to claim 9, further comprising a locking member arranged to selectively lock together said nose and said body at said gap, and not including any other connection between said nose and said body.

12. The lifting airfoil according to claim 1, further comprising a moveable support arrangement arranged and connected to said flap trailing edge body between said actuating device and a junction of said flap trailing edge body and said flap leading edge nose, wherein said moveable support arrangement is so arranged and adapted to support said flap trailing edge body while moving along with movements of said flap.

13. The lifting airfoil according to claim 1, wherein at least one of said cover skins of said flap trailing edge body is tangentially displaceable to a limited extent relative to said flap leading edge nose.

14. The lifting airfoil according to claim 13, wherein a free movement gap exists between said flap leading edge nose and said flap trailing edge body so as to allow said at least one of said cover skins of said flap trailing edge body to be tangentially displaceable to a limited extent relative to said flap leading edge nose.

15. The lifting airfoil according to claim 13, further comprising means for selectively locking said tangential displaceability of said at least one cover skin.

16. A lifting airfoil comprising:
an airfoil body having a forward edge and a rear edge,
a flap movably connected to said airfoil body at said rear edge, wherein said flap comprises a flap leading edge nose and a flap trailing edge body, said flap trailing edge body is elastically flexible, said flap trailing edge body terminates along a flap trailing edge that forms a trailing edge of said airfoil, and said flap leading edge nose and said flap trailing edge body comprise and are bounded by a pressure-side cover skin and a vacuum-side cover skin,
an actuating device that is pivotally connected to said flap and that is adapted to selectively elastically bend said flap trailing edge body, and
a movement mechanism whereby said flap is movably connected to said airfoil body and enabled to be extended away from said airfoil body, wherein said movement mechanism comprises a guide rail connected to said airfoil body and extending rearwardly therefrom, a carriage arranged to be movable along said guide rail, and a forward bearing bracket connecting said flap leading edge nose to said carriage.

17. The lifting airfoil according to claim 16, wherein said actuating device is pivotally connected to said flap trailing edge body and is further pivotally connected to said guide rail.

18. The lifting airfoil according to claim 16, further comprising a moveable support arrangement that is arranged and connected to said flap trailing edge body between said actuating device and a junction of said flap trailing edge body and said flap leading edge nose and that is further connected to said forward bearing bracket, wherein said moveable support arrangement is so arranged and adapted to support said flap trailing edge body while moving along with movements of said flap.

19. The lifting airfoil according to claim 16, wherein said flap leading edge nose is rigidly secured to said forward bearing bracket, and further comprising a first pivot bolt that has a bolt axis extending in a span width direction of said airfoil and that pivotally connects said forward bearing bracket with said carriage, such that said flap leading edge nose and said forward bearing bracket together are pivotable about said bolt axis relative to said carriage.

20. The lifting airfoil according to claim 19, further comprising a first locking bolt that selectively lockingly connects said forward bearing bracket with said carriage, such that the pivotability of said flap leading edge nose and said forward bearing bracket is selectively blockable by said first locking bolt.

21. The lifting airfoil according to claim 16, wherein said forward bearing bracket is rigidly secured to said carriage, and further comprising a second pivot bolt that has a bolt axis extending in a span width direction of said airfoil and that pivotally connects said flap leading edge nose with said forward bearing bracket, such that said flap leading edge nose is pivotable about said bolt axis relative to said forward bearing bracket and said carriage.

22. The lifting airfoil according to claim 21, further comprising a second locking bolt that selectively lockingly connects said flap leading edge nose with said forward bearing bracket, such that the pivotability of said flap leading edge nose is selectively blockable by said second locking bolt.

23. The lifting airfoil according to claim 1, wherein said flap is movably connected to said airfoil body in such a manner that said flap leading edge nose is pivotable relative to said airfoil body about a pivot axis extending in a span width direction of said airfoil.

24. The lifting airfoil according to claim 23, further comprising means for selectively blocking the pivoting of said flap leading edge nose about said pivot axis.

25. A lifting airfoil comprising:

an airfoil body having a forward edge and a rear edge, a flap movably connected to said airfoil body at said rear edge, wherein said flap comprises a flap leading edge nose and a flap trailing edge body, said flap trailing edge body is elastically flexible, said flap trailing edge body terminates along a flap trailing edge that forms a trailing edge of said airfoil, and said flap leading edge nose and said flap trailing edge body comprise and are bounded by a pressure-side cover skin and a vacuum-side cover skin, and an actuating device that is pivotally connected to said flap and that is adapted to selectively elastically bend said flap trailing edge body, wherein said flap is movably connected to said airfoil body in such a manner that said flap is slidably extendable away from said airfoil body, and said actuating device is arranged and adapted to interconnect said flap and said airfoil body so that said actuating device can tiltingly pivot and thereby cause said flap to pivot relative to said airfoil body as said flap is slidingly extended away from said airfoil body.

26. The lifting airfoil according to claim 1, further comprising a control unit that is connected for control signal transmission at least to said actuating device, and that is adapted to control and coordinate all movements of said flap relative to said airfoil body and of said flap trailing edge body relative to said flap leading edge nose.

27. The lifting airfoil according to claim 1, wherein said flap and said actuating device are so arranged and adapted to be able to achieve an elastic bending deflection of said flap trailing edge body selectively upward and downward from a neutral position in an angular range of at least ±15° about said neutral position, without a fixed distinct deflection axis about which said bending deflection occurs.

28. A method of varying the camber of a lifting airfoil including:

an airfoil body having a forward edge and a rear edge, a flap movably connected to said airfoil body at said rear edge, wherein said flap comprises a flap leading edge nose and a flap trailing edge body, said flap trailing edge body is elastically flexible, said flap trailing edge body terminates along a flap trailing edge that forms a trailing edge of said airfoil, and said flap leading edge nose and said flap trailing edge body comprise and are bounded by a pressure-side cover skin and a vacuum-side cover skin, and an actuating device that is pivotally connected to said flap and that is adapted to selectively elastically bend said flap trailing edge body, said method comprising the following steps:
- a) simultaneously pivoting said flap relative to said airfoil body and slidingly extending said flap away from said airfoil body during at least one of a take-off phase and a landing phase of a flight, and
- b) operating said actuating device so as to elastically flexibly bend and deflect said flap trailing edge body away from a neutral position during at least a cruise flight phase of said flight.

29. The method according to claim 28, further comprising maintaining said flap trailing edge body in said neutral position without flexibly bending during said step a).

30. An airfoil comprising a main airfoil body, a rigid guide rail connected to and extending rearwardly from said airfoil body, a carriage arranged to be movable along said guide rail;

a flap including a flap nose member forming a leading edge of said flap and a flap trailing edge body forming a trailing edge of said flap, wherein said flap nose member is pivotably connected to said carriage, said flap nose member and said flap trailing edge body each comprise a supporting structure covered by respective upper and lower cover skins, one of said cover skins continuously extends over and bridges between said flap nose member and said flap trailing edge body so as to connect said flap nose member with said flap trailing edge body, and said flap trailing edge body is elastically flexibly bendable in a plane extending parallel to a chord length of said flap, and an actuating device that has a selectively variable length and that is pivotally connected to said flap trailing edge body and to said guide rail.

31. The airfoil according to claim 30, wherein said one of said cover skins forms a flexible hinge connection between said flap nose member and said flap trailing edge body, and the other of said cover skins is interrupted by a gap between said flap nose member and said flap trailing edge body.

32. The airfoil according to claim 31, further comprising a support arrangement including a rigid support arm rigidly connected to and extending from said flap nose member and an actuatable supporting device connecting said rigid support arm with said flap trailing edge body between said actuating device and said gap.

\* \* \* \* \*